I. T. LEAGER.
CORN SHOCKER.
APPLICATION FILED JUNE 1, 1908.

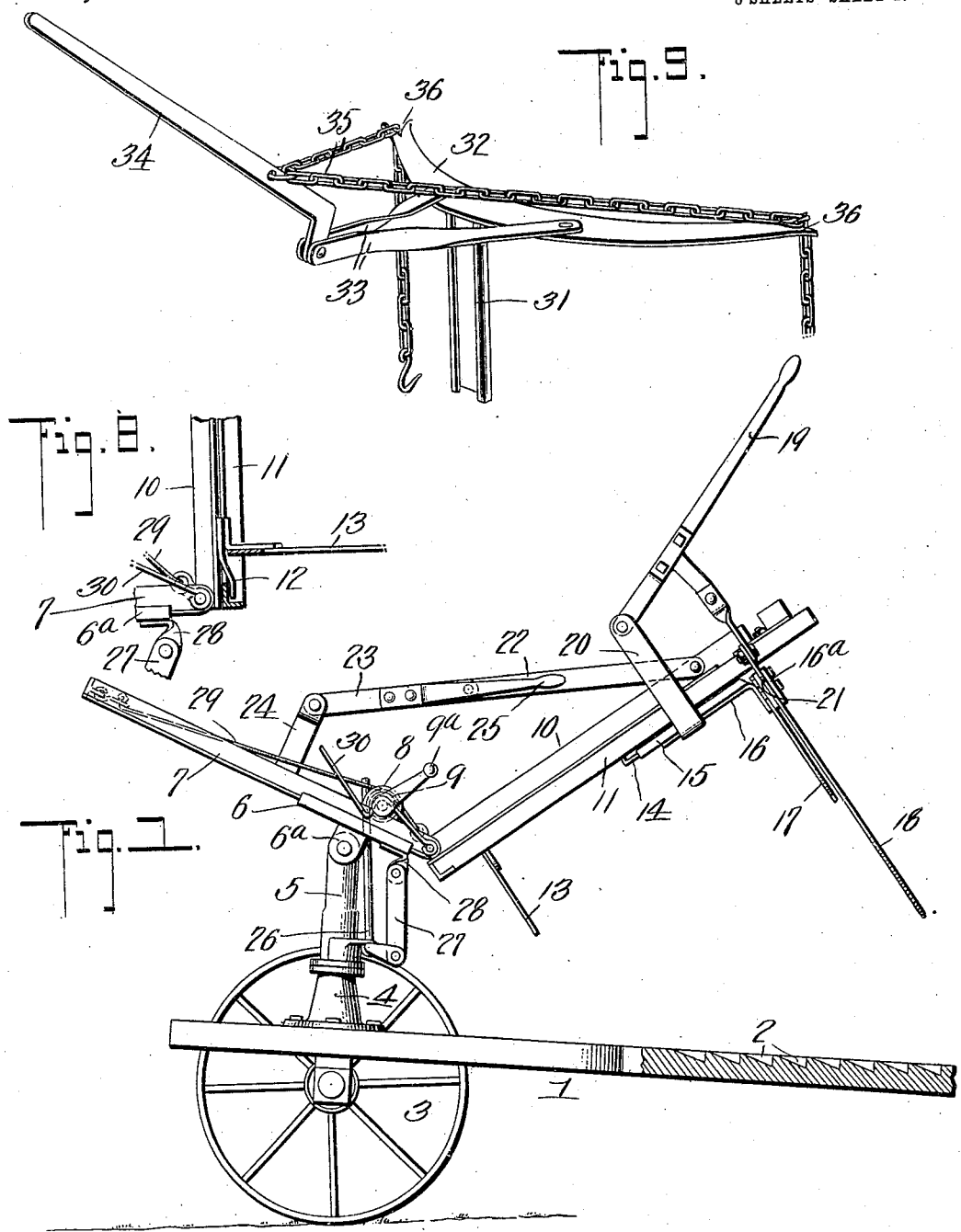

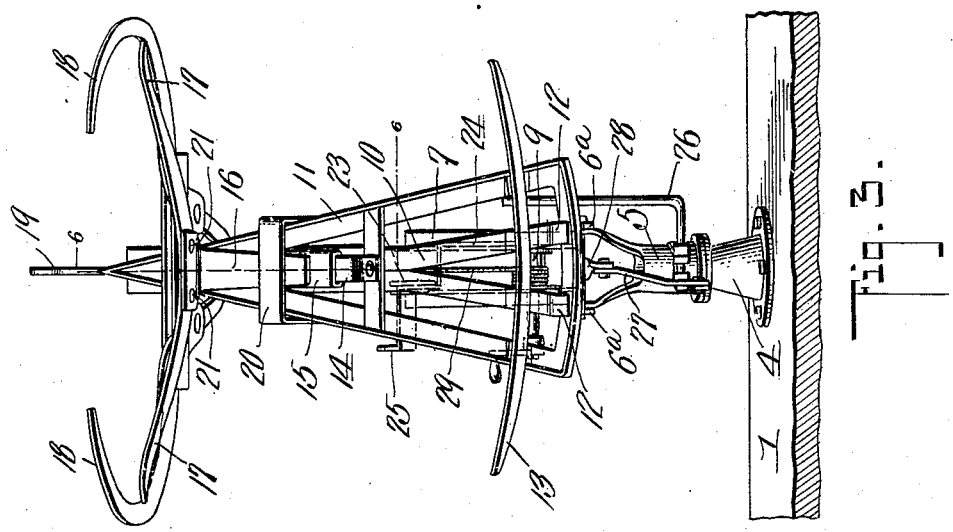
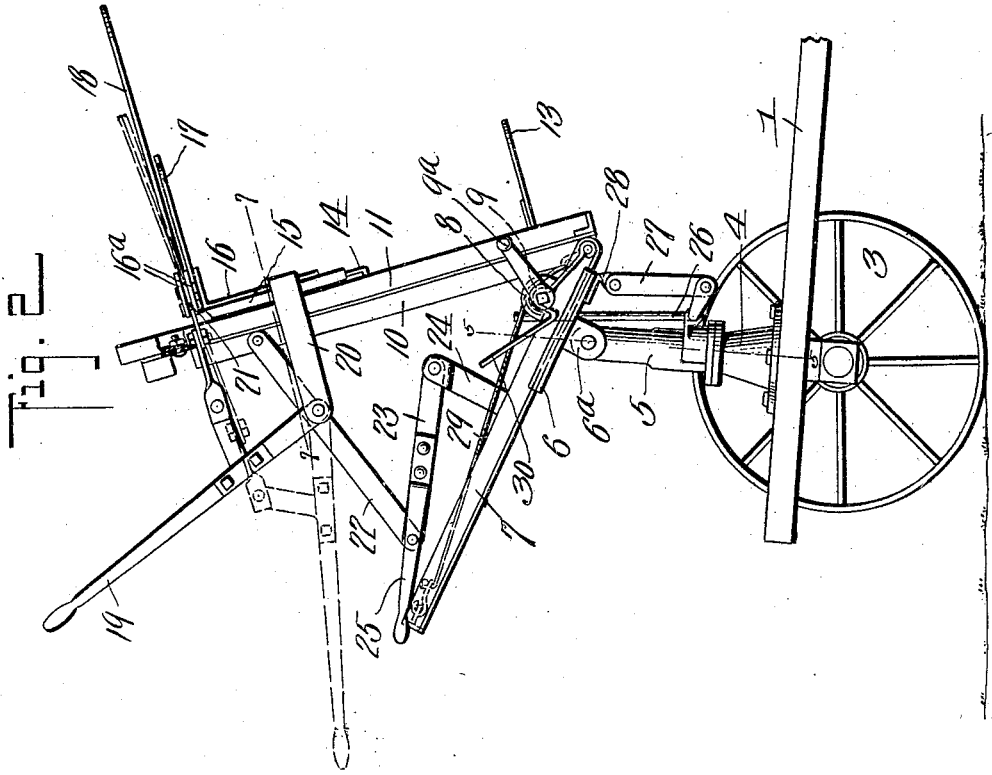

938,595.

Patented Nov. 2, 1909.
3 SHEETS—SHEET 3.

Witnesses

Inventor
I. T. Leager
By
Attorneys

UNITED STATES PATENT OFFICE.

IRA T. LEAGER, OF CHESTERTOWN, MARYLAND.

CORN-SHOCKER.

938,595.  Specification of Letters Patent.  Patented Nov. 2, 1909.

Application filed June 1, 1908. Serial No. 436,029.

*To all whom it may concern:*

Be it known that I, IRA T. LEAGER, a citizen of the United States of America, residing at Chestertown, in the county of Kent and State of Maryland, have invented a new and useful Improvement in a Corn-Shocker, of which the following is a specification.

This invention relates to a device for shocking corn and is intended to be placed upon the rear portion of a corn harvester of any suitable construction, and it will be understood that this invention does not relate in any way to that portion of the harvester which performs the work of cutting the stalks or which may be employed for the purpose of placing in position upon a suitable platform the stalks so cut. I have therefore shown only that portion of the harvester frame and platform which relates directly to my invention.

The object of the invention is to form the cut stalks into a shock; to level off the lower end of the shock so formed; to carry the shock to one side of the platform; and to then deposit it upon the ground in an upright position, due allowance being made for the inclination of the ground when the corn harvested is grown upon a hillside.

With these objects in view, my invention consists in the novel features of construction hereinafter described, pointed out in the claims and shown in the accompanying drawings, in which—

Figure 4:
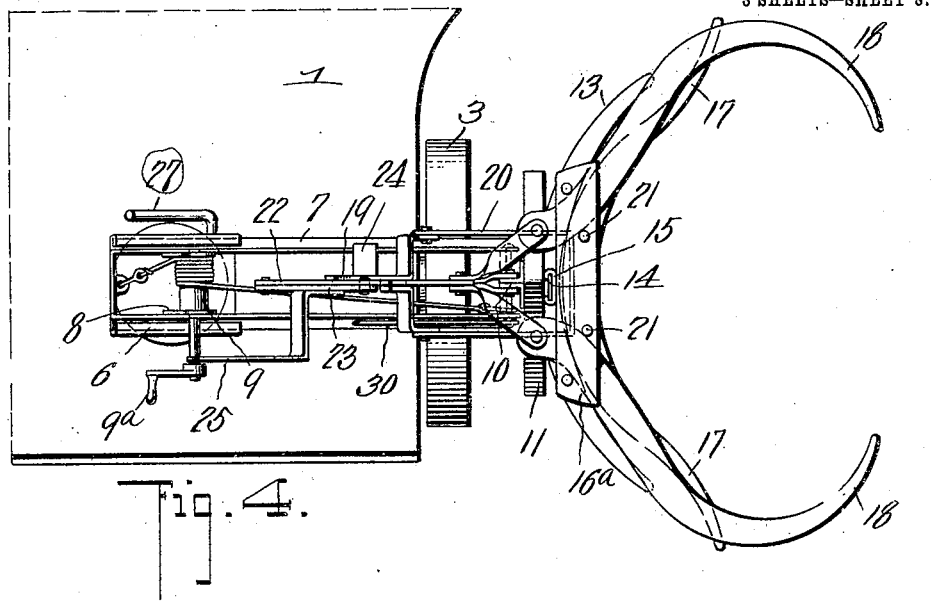
Figure 5:
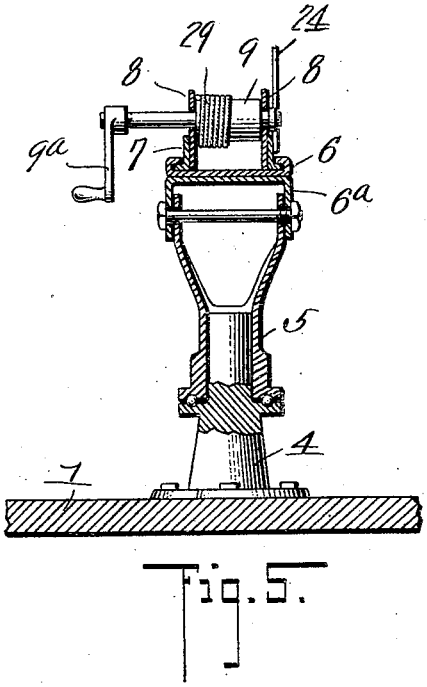
Figure 6:
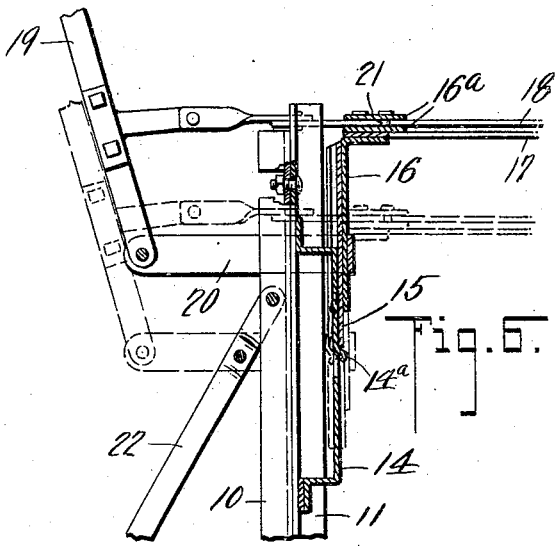
Figure 7:
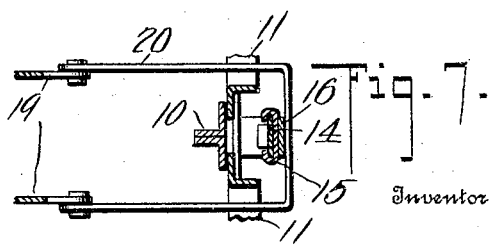

Figure 1 is a side elevation of my device in position to receive the cut stalks, a portion of the supporting platform being shown in section. Fig. 2 is a side elevation the parts being in position to level the lower end of the shock. Fig. 3 is a front view of the device, the parts being in the position shown in Fig. 2. Fig. 4 is a plan view of the device, the parts being shown in the position occupied when a shock is deposited upon the ground. Fig. 5 is a section on the line 5—5 of Fig. 2. Fig. 6 is a section on the line 6—6 of Fig. 3. Fig. 7 is a section on the line 7—7 of Fig. 2. Fig. 8 is a detail view partly in section showing the construction of the lower portion of a swinging frame. Fig. 9 is a detail perspective view showing a modified form of shock holding means.

In these drawings 1 represents the platform of a harvester the forward portion of which is transversely grooved as shown at 2, to prevent forward slipping of the stalks as they are thrown back into the shock forming arms. This platform is provided with rear supporting wheels 3. Upon the platform is mounted a post 4 upon which is mounted a rotatable bifurcated standard 5 upon the upper end of which is pivotally mounted a guide way 6 said guide way being formed of a metal plate having its sides bent over forming channels in which slide the side members of a rectangular frame 7 formed of bars of L-shaped metal. This guide way may be pivoted directly upon the standard or as shown in the drawings may rest upon an angled bracket 6$^a$ the end portions of which are bent down and pivotally connected to said standard. Upon the guide way and within the frame 7 are mounted suitable bearings 8 which support a rotatable drum 9 operated by means of a handle 9$^a$. To the front end of the frame 7 is pivotally mounted an upright 10 formed of two bars of angle iron having their lower end portions spread apart forming an A-shaped base portion, the intermediate and upper end portions of said bars being in parallel contact with each other and secured together by rivets or other suitable means, or if preferred the upright may be cast in one piece the shape described above being retained in the casting. The upright carries an A-shaped frame 11 the apex portion of which is pivotally connected to the upper portion of the upright and the lower portion or bottom base member of said frame 11, also formed of pieces of L-shaped metal, slides between the base portion of the upright 10, and the free ends of two strips of spring metal 12, which construction is illustrated in detail in Fig. 8, in which view the lower under side of the frame 11 is shown in section, said section being taken between the strips 12 one of which is shown in elevation. Adjacent its lower end the frame 11 carries a crescent-shaped bar 13 rigidly secured intermediate its ends to the side members of the frame 11. The upper portion of the frame 11 carries a vertically arranged guide bar 14 the ends of which are angled and secured to the frame 11 and the body portion of which is offset so as to stand out from said frame. A suitable flanged plate 15 slides on the guide bar 14 and supports the vertical member 16 of a T-shaped bracket, the cross heads 16$^a$ of which are arranged one above the other and spaced slightly apart. The plate 15 being slidable on the guide bar 14 vertical adjustment is thus allowed for the member 16 and all parts carried thereby, such adjustment being necessary in order to operate the arms to be now described with either short or tall cornstalks. This bracket carries forwardly extending fixed compound curved arms 17 and through said bracket, working between the heads are two curved shock gripping arms 18 the rear ends of which are pivotally connected to a lever 19 which in turn is pivotally carried by the end portions of a U-shaped bracket 20 the bow portion of which is secured to the vertical member 16 of the T bracket, the said U-shaped bracket inclosing the frame 11 and swinging with it. A spring tongue or detent 14ª is formed by slotting the bar 14 and this tongue engages the lower edge of the plate 15 and holds it in raised position, the tongue being pushed inwardly, as shown in dotted lines in Fig. 6, when the plate 15 moves downwardly. Suitable pins 21 arranged in pairs serve not only to secure the cross heads of the T bracket in place but also serve as guide pins through which the curved arms 18 work, and it will be obvious that when the lever 19 is thrown back into the position shown by the dotted lines in Fig. 2 that the free ends of the arms 18 will be brought together thereby practically forming a circular band, and as downward and rearward movement of the lever 19 is continued the circle will decrease in diameter as the end portions of said arms overlap, and continued movement of the lever will cause the arms to cross each other, the space inclosed between said arms and the head 16ᵇ of the T bracket will take the form of a Gothic arch, decreasing in size as the lever reaches the limit of its rearward and downward movement. The object of these arms is to grip and bind tightly together the upper end portions of the stalks gripping them in such a manner that the stalks in the center of the shock will be wedged tightly in place and held against slipping.

Owing to the brittle polished rounded surface of the corn stalks considerable difficulty has been experienced in handling large shocks owing to the tendency of the central core of the shock to slip and fall downwardly out of position, thus loosening the entire shock and nullifying the action of the gripping means, which means was of course only in actual engagement with the outer stalks of the shock. This difficulty has been particularly present when the gripping means as it tightened about the shock retained a circular form, and by forming and mounting the stalk gripping arms 18 as above described so that in closing they will first take a circular position to surround and shape the shock and will then as they tighten take a triangular position in the form of an arch, all of the stalks are so tightly bound together that there is no slipping of the center of the shock as it is swung from one position to another. It may be properly stated here that in actual use the stalks from about one hundred and fifty hills are gathered for the purpose of forming a single shock, the number varying of course with the size of the corn and the number of shock which may be left standing to the hill. It will be understood, however that the shocks are of considerable size and too heavy to be handled without the aid of some lifting mechanism.

To swing the upright 10 upon its pivoted base portion and also to suitably brace the same I pivotally connect to its upper portion a link 22 which in turn is pivotally connected to a link 23, also pivotally connected to a suporting bracket 24 carried by one side of the slidable frame 7. To the link 23 is rigidly secured an offset lever 25 and by throwing the said lever backward and forward the upright 10 will be given a forward or rearward inclination, of course carrying with it the frame 11 and the parts connected thereto.

A cranked shaft 26 is rotatably mounted upon the forward side of the standard 5 to an up-turned end portion of which is pivotally connected a link 27 which is also pivotally secured to a depending tongue 28 carried by the guide way 6. The other end portion of the cranked shaft 26 forms a suitable handle and by means of the same the guide way 6 and the slidable frame 7 carried thereby are adjusted for the purpose of raising or lowering the forward end of the frame 7. Upon the drum 9 winds a cable 29 the ends of which are secured to the opposite ends of the frame 7. A latch locking member 30 formed of wire is pivotally connected to the forward end of the frame 7 and when brought into engagement with the crank handle 9ª locks the drum against rotation by preventing winding and unwinding of the cable.

In operation the device is first thrown into the position shown in Fig. 1 and the harvester driven between two rows of corn stalks which are cut by the harvester and thrown by any suitable means upon the platform 1. An attendant receives the stalks and throws them back into the space inclosed by the spreading of the arms 18, the stalks also being received by the fixed arms 17 which coöperate with the movable arms 18. When a sufficient number of stalks have been gathered to form a shock they are gripped by partially closing the arms 18 by throwing back the lever 19 and the device is then lifted into the position shown in Fig. 2, said lifting movement being effected through the lever 26. This lifts the arms 18 into a higher position and also brings the shock into a position in which the stalks will incline slightly upwardly and backward.

By swinging the frame 11 slightly forward so as to bring the arms 18 into a position substantially parallel to the platform 1, and slightly spreading apart the arms 18 so as to loosen their grip upon the stalks the lower end of the shock can be leveled, so that when finally deposited upon the ground the lower ends of all of the stalks will rest firmly upon the earth. The shock is then gripped by throwing the lever 19 in the position shown by dotted lines in Fig. 2 and the other parts also being thrown into said position, thus lifting the bottom of the shock clear of the platform. The standard 5 is then rotated upon its supporting base 4, bringing the frame 7 at right angles to the platform 1, the catch 30 is disengaged and the handle 9ª rotated. This causes a portion of the cable 29 to wind upon the drum 9 while the remaining portion unwinds thus propelling the frame 7 along the guide way 6 until it reaches the position shown in Fig. 4, the shock holding arms being thus moved above the supporting wheel 3 upon one side of the platform, and by throwing the lever 25 forward to bring the arms 18 into a horizontal position, and throwing forward the lever 19 to spread said arms apart, the shock is released and is deposited in a perpendicular position upon the ground. It will be noted that as the frame 11 is pivotally suspended from its upper portion it will hang in a perpendicular position no matter whether the harvester is stopped upon level or upon sloping ground.

In Fig. 9 I have shown a modified construction of shock holding means in which a flanged plate 31, corresponding to the plate 15 and held upon the guide bar 14 in the same manner as the plate 15 carries a rigid curved arm 32 and rearwardly extending brackets 33 between which are pivotally mounted an angled lever 34 to which a chain 35 is secured midway its ends. The ends of the arm 32 are notched as shown at 36 in which notches the end portions of the chain are normally held. When this construction is used the ends of the chain are hooked together around the shock, and the lever 34 drawn back, the flexible chain taking the place of the pivoted arms 18. The construction of the other parts being the same their operation is unchanged by substitution of the modified form of the gripping device.

Having thus fully described my invention, what I claim as new and desire to secure by Letters Patent, is:—

1. In a corn shocker, a rotatable standard, curved arms supported by the upper portion of said standard, said arms having adjacent end portions slidably and pivotally mounted, means for rotating the standard and means for moving the end portions of the arms along a straight line.

2. In a corn shocker a rotatable standard, a frame slidably mounted upon said standard, an upright pivotally connected to said slidable frame, a frame carried by said upright, and pivotally connected to the upper end of said upright, an adjustable bracket carried by the last mentioned frame, curved arms supported by said bracket, adjacent ends of said arms being pivoted to a movable support at a distance from each other, the free end portions of said arms coming together upon rearward movement of said support, the said free end portions of the arms crossing each other upon continued rearward movement of the said support.

3. A corn shocker comprising a vertically swinging frame, a T bracket carried by said frame, a lever supported by said frame, and curved arms working through said T bracket and pivotally connected to said lever.

4. A corn shocker comprising a forwardly and rearwardly movable upright, an A-shaped frame pivotally connected at its apex portion to the upper portion of said upright, curved gripping arms supported from said frame, means for closing said arms, and for guiding them at their ends in a straight direction during said closing movement.

5. A corn shocker comprising a slidable frame, rotatable supporting means for said frame, an upright hinged to said frame, a second frame having its upper portion pivotally connected to the upper portion of the upright, and movable gripping arms supported by and swinging with the second mentioned frame.

6. A corn shocker comprising a rotatable standard, a rectangular frame pivotally carried by said standard, said frame having a vertical movement, an upright pivotally connected to the forward end of the frame, a frame pivotally connected to said upright, said last mentioned frame swinging with respect to said upright, a lever carried by said second mentioned frame, a guide bracket carried thereby, and curved arms working through the guide bracket, said arms being pivotally connected to the lever.

7. A corn shocker comprising rotatable standard, a guide way pivotally mounted upon said standard, a frame sliding longitudinally in said guide way, means for sliding said frame an upright pivotally carried by the frame, and shock gripping means supported from the upper portion of said upright.

IRA T. LEAGER.

Witnesses:
Lewis K. Stam,
Thomas Massey.